(12) United States Patent
Nishio et al.

(10) Patent No.: US 7,940,641 B2
(45) Date of Patent: May 10, 2011

(54) WIRELESS COMMUNICATION BASE STATION APPARATUS, WIRELESS COMMUNICATION MOBILE STATION APPARATUS AND PILOT SIGNAL SEQUENCE ALLOCATING METHOD IN MULTICARRIER COMMUNICATION

(75) Inventors: Akihiko Nishio, Kanagawa (JP); Masayuki Hoshino, Kanagawa (JP); Daichi Imamura, Kanagawa (JP)

(73) Assignee: Panasonic Corporation, Osaka (JP)

( * ) Notice: Subject to any disclaimer, the term of this patent is extended or adjusted under 35 U.S.C. 154(b) by 737 days.

(21) Appl. No.: 11/996,901

(22) PCT Filed: Jul. 27, 2006

(86) PCT No.: PCT/JP2006/314902
§ 371 (c)(1),
(2), (4) Date: Jan. 25, 2008

(87) PCT Pub. No.: WO2007/013560
PCT Pub. Date: Feb. 1, 2007

(65) Prior Publication Data
US 2010/0208664 A1     Aug. 19, 2010

(30) Foreign Application Priority Data
Jul. 29, 2005   (JP) .................. 2005-220616

(51) Int. Cl.
*H04J 11/00*     (2006.01)
*H04W 4/00*     (2009.01)
*H04K 1/10*     (2006.01)
*H04L 27/28*     (2006.01)

(52) U.S. Cl. .................. 370/208; 370/329; 375/260

(58) Field of Classification Search ............. 370/208, 370/260, 329; 375/260
See application file for complete search history.

(56) References Cited

U.S. PATENT DOCUMENTS

| | | | |
|---|---|---|---|
| 5,751,761 A * | 5/1998 | Gilhousen | 375/146 |
| 6,526,091 B1 * | 2/2003 | Nystrom et al. | 375/142 |
| 7,095,778 B2 * | 8/2006 | Okubo et al. | 375/130 |

(Continued)

FOREIGN PATENT DOCUMENTS
JP     2004-208254     7/2004

OTHER PUBLICATIONS
International Search Report dated Oct. 10, 2006.

(Continued)

*Primary Examiner* — Chi H Pham
*Assistant Examiner* — Farah Faroul
(74) *Attorney, Agent, or Firm* — Dickinson Wright PLLC

(57) ABSTRACT

A wireless communication apparatus by which the orthogonality between the pilot signal sequences between adjacent sectors or cells can be prevented from collapsing due to a frequency selectivity fading. In this apparatus, modulating parts (102-1 to 102-m) modulate encoded data to generate data symbols, and a pilot symbol generating part (103) modulates a received pilot signal sequence to generate pilot symbols. A multiplexing part (104) time multiplexes the pilot symbols and the data symbols. Orthogonal Variable Spreading Factor (OVSF) sequences are used as the pilot signal sequences. The pilot symbol generating part (103) receives an OVSF sequence, among a plurality of OVSF sequences having the same sequence length but being orthogonal to each other, which is orthogonal to an OVSF sequence used as a pilot signal sequence in an adjacent sector and which is orthogonal to that OVSF sequence in a unit shorter than the sequence length.

7 Claims, 12 Drawing Sheets

U.S. PATENT DOCUMENTS

| | | |
|---|---|---|
| 2004/0091057 A1 | 5/2004 | Yoshida |
| 2004/0216025 A1* | 10/2004 | Kim et al. ..................... 714/755 |
| 2005/0201477 A1* | 9/2005 | Cho et al. ...................... 375/260 |
| 2008/0137760 A1* | 6/2008 | Forck et al. ................... 375/260 |
| 2010/0002570 A9* | 1/2010 | Walton et al. ................. 370/208 |
| 2010/0034076 A1* | 2/2010 | Kishiyama et al. ........... 370/210 |
| 2010/0111142 A1* | 5/2010 | Iwai et al. ..................... 375/146 |
| 2010/0118919 A1* | 5/2010 | Nakao et al. .................. 375/140 |
| 2010/0177688 A1* | 7/2010 | Kishiyama et al. ........... 370/328 |
| 2010/0202554 A1* | 8/2010 | Kramer et al. ................ 375/285 |
| 2010/0238818 A1* | 9/2010 | Takaoka et al. ............... 370/252 |
| 2010/0246701 A1* | 9/2010 | Gerstenberger et al. ...... 375/260 |

OTHER PUBLICATIONS

3GPP TSG RAN WG1 Ad Hoc on LTE, "Pilot Channel and Scrambling Cod in Elvolved UTRA Downlink," NTT DoCoMo, R1-050589, Jun. 2005, pp. 1-24.

* cited by examiner

WIRELESS COMMUNICATION BASE STATION APPARATUS, WIRELESS COMMUNICATION MOBILE STATION APPARATUS AND PILOT SIGNAL SEQUENCE ALLOCATING METHOD IN MULTICARRIER COMMUNICATION

TECHNICAL FIELD

The present invention relates to a radio communication base station apparatus, radio communication mobile station apparatus and pilot signal sequence assignment method in multicarrier communication.

BACKGROUND ART

In recent years, various types of information such as image and data in addition to speech are targeted in radio communication, particularly in mobile communication. With this trend, there is a growing demand for high reliability and high speed transmission. However, when high speed transmission is performed in mobile communication, influences of delay signals due to multipath transmission cannot be ignored, and the transmission performances deteriorate due to frequency selective fading.

Multicarrier communication represented by an OFDM (Orthogonal Frequency Division Multiplexing) scheme is becoming a focus of attention as one of techniques for preventing frequency selective fading. The multicarrier communication enables high speed transmission by transmitting data using a plurality of subcarriers where the transmission speed is suppressed to an extent that no frequency selective fading would occur. Particularly in the OFDM scheme, frequencies of a plurality of subcarriers where data is arranged are orthogonal to each other, and therefore the OFDM scheme has high frequency efficiency among multicarrier communication schemes, and the OFDM scheme can also be implemented in a relatively simple hardware configuration. For this reason, the OFDM scheme is attracting attention as a communication method used for mobile communication based on a cellular scheme, and various studies on the OFDM scheme are underway.

On the other hand, in the cellular scheme, a radio communication mobile station apparatus (hereinafter simply "mobile station") located near a sector boundary or cell boundary receives large interference from neighboring sectors or neighboring cells, and so the reception performances such as an error rate and throughput deteriorate. Especially, when pilot signals receive such large interference, the reception performances deteriorate significantly.

On the contrary, there is a technique which reduces the influence of interference on pilot signals received from neighboring sectors and improves the reception performances by using pilot signal sequences orthogonal to each other among neighboring sectors (e.g., see Non-Patent Document 1).

Here, the "sector" refers to each of a plurality of areas obtained by dividing an area (i.e., cell) covered by one radio communication base station apparatus (hereinafter simply "base station"), and one base station transmits signals to a plurality of sectors included in one cell with their respective directivities. The same will apply to the following explanations.

Non-Patent Document 1: 3GPP RAN WG1 LTE Adhoc meeting (2005.06) R1-050589

DISCLOSURE OF INVENTION

Problems to be Solved by the Invention

The above described technique of Non-Patent Document 1 uses an OVSF (Orthogonal Variable Spreading Factor) sequence, which is an orthogonal sequence, as a pilot signal sequence. In the OVSF sequence, the number of orthogonal sequences is equal to a sequence length thereof, and the sequence length is a value of a power of 2. Therefore, when the number of sectors included in one cell becomes larger, the number of sequences, that is, the sequence length needs to be made larger. When, for example, one cell is formed with three sectors, four orthogonal sequences of sequence length 4 are enough to assign mutually different orthogonal sequences to the sectors respectively, but when one cell is formed with six sectors, eight orthogonal sequences of sequence length 8 are required to assign mutually different orthogonal sequences to the sectors, respectively.

When a mobile station carries out channel estimation using pilot signal sequences, for keeping an orthogonal relationship with pilot signal sequences of neighboring sectors, correlation needs to be calculated for the received pilot signal sequences in the range corresponding to the sequence length. For this reason, the mobile station also requires a longer range for correlation calculations when the number of sectors included in one cell becomes larger.

However, when the range for correlation calculations becomes longer in this way, loss of orthogonality between the received pilot signal sequences and pilot signal sequences of the neighboring sectors becomes more significant at a mobile station where frequency selective fading is significant (that is, where the received signal level fluctuates significantly in the frequency domain), resulting in deterioration of the reception performances such as an error rate and throughput.

It is therefore an object of the present invention to provide a radio communication base station apparatus, radio communication mobile station apparatus and pilot signal sequence assignment method capable of preventing loss of orthogonality between pilot signal sequences among neighboring sectors or among neighboring cells due to frequency selective fading even if the number of sectors or the number of cells increases in multicarrier communication and capable of improving reception performances.

Means for Solving the Problem

The base station of the present invention, which transmits a multicarrier signal comprised of a plurality of subcarriers, employs a configuration having: a multiplexing section that multiplexes one of a plurality of orthogonal sequences which are orthogonal to each other and which have a same sequence length, as a pilot signal sequence with the plurality of subcarriers; and a transmission section that transmits the multicarrier signal multiplexed with the pilot signal sequence, and in the base station, the multiplexing section multiplexes, out of the plurality of orthogonal sequences, a second orthogonal sequence with the plurality of subcarriers, the second orthogonal sequence being orthogonal to a first orthogonal sequence used as a pilot signal sequence in a neighboring sector or a neighboring cell in units shorter than the sequence length.

Advantageous Effect of the Invention

According to the present invention, it is possible to prevent loss of orthogonality between pilot signal sequences among neighboring sectors or among neighboring cells due to frequency selective fading and improve the reception performances.

BEST MODE FOR CARRYING OUT THE INVENTION

Embodiments of the present invention will be described in detail below with reference to the accompanying drawings.

Embodiment 1

The base station according to the present embodiment transmits a multicarrier signal comprised of a plurality of subcarriers and, out of a plurality of orthogonal sequences which are orthogonal to each other and which have the same sequence length, multiplexes a second orthogonal sequence as a pilot signal sequence with the plurality of subcarriers, the second sequence being orthogonal to a first orthogonal sequence used as a pilot signal sequence in a neighboring sector in units shorter than the sequence length thereof.

Figure 1:
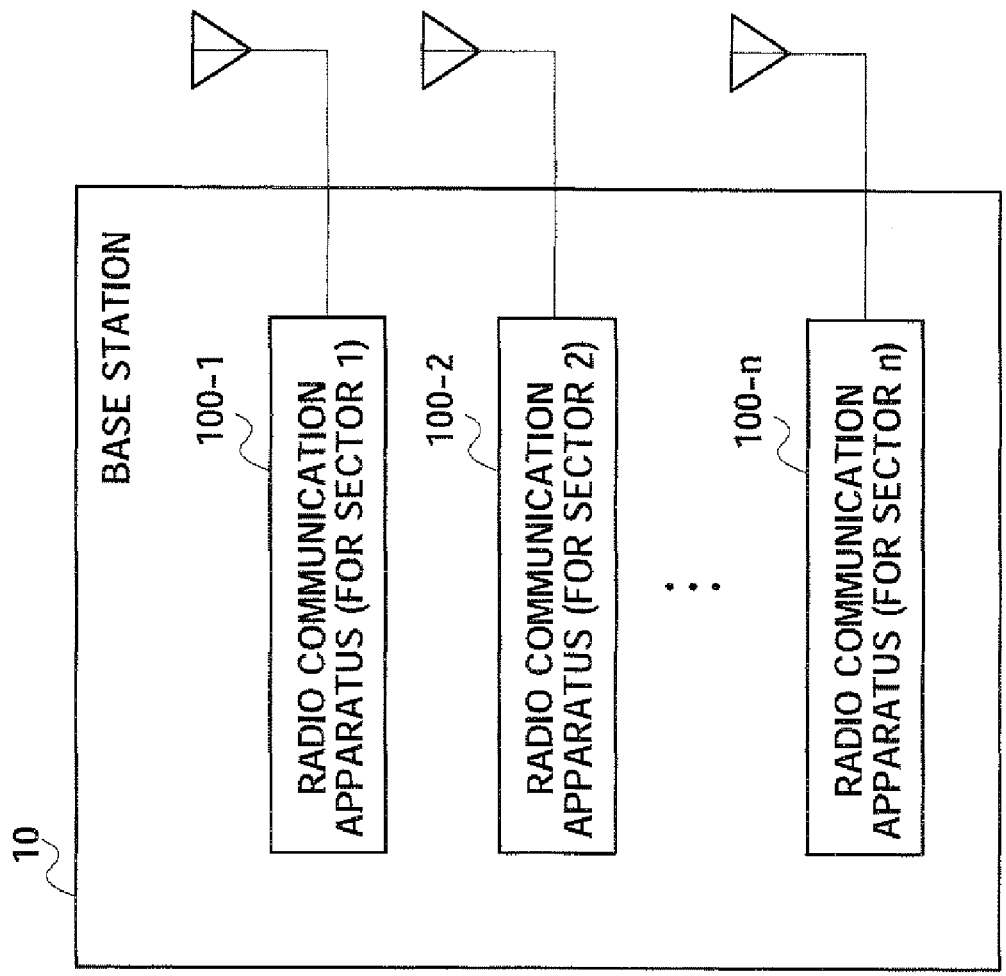
FIG. 1 is a block diagram showing the configuration of a base station according to Embodiment 1 of the present invention.

FIG. 1 shows the configuration of base station 10 according to the present embodiment. Base station 10 has radio communication apparatuses 100-1 to 100-$n$ for their respective sectors 1 to n.

Figure 2:
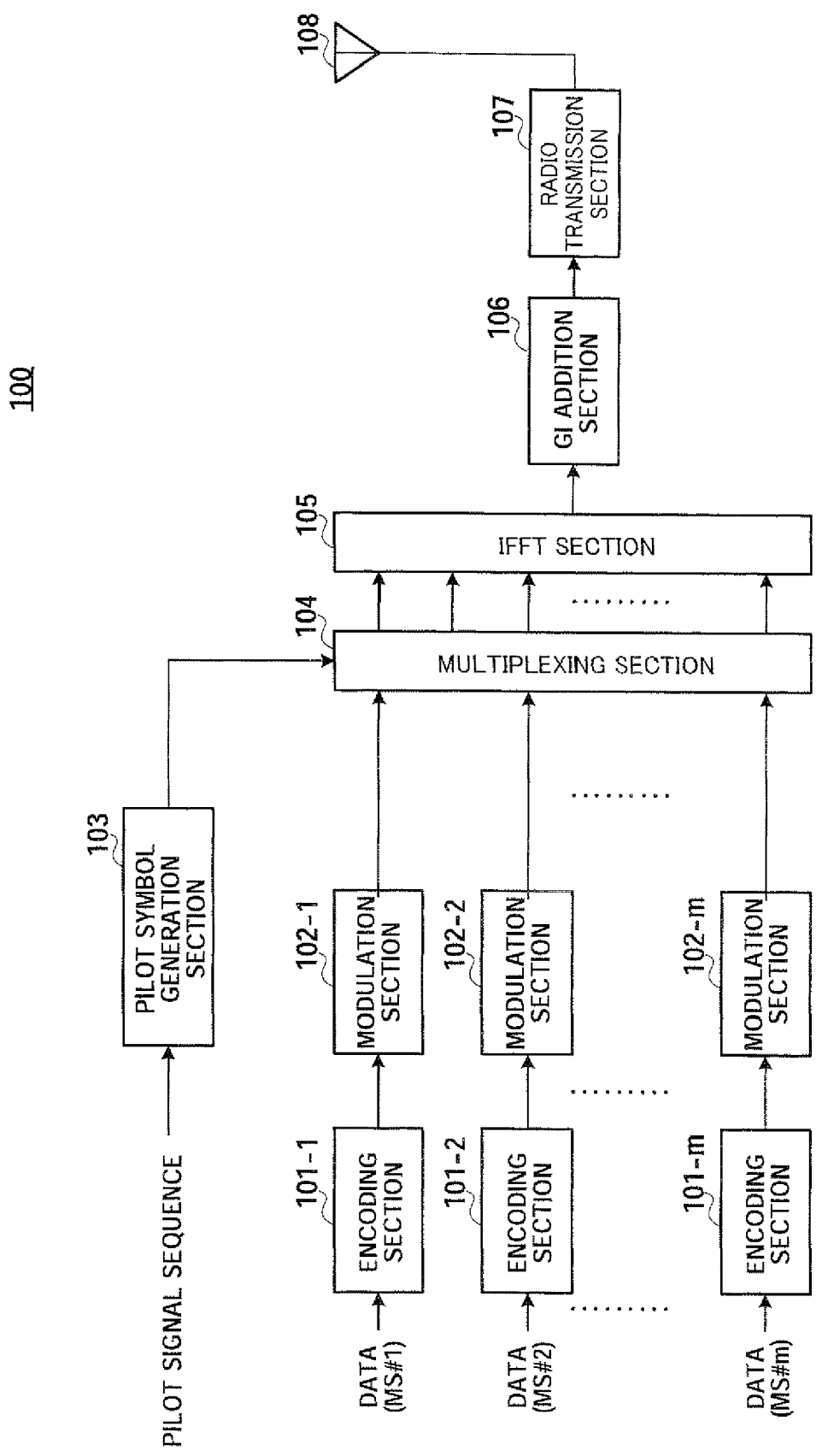
FIG. 2 is a block diagram showing the configuration of a radio communication apparatus according to Embodiment 1 of the present invention.

The configuration of each radio communication apparatus is as shown in FIG. 2. According to the present embodiment, all radio communication apparatuses 100-1 to 100-$n$ shown in FIG. 1 employ the configuration shown in FIG. 2. Furthermore, radio communication apparatus 100 shown in FIG. 2 frequency-multiplexes data for a plurality of mobile stations MS#1 to MS#m in each sector with a plurality of subcarriers forming an OFDM symbol in each, sector and transmits the multiplexed data.

In radio communication apparatus 100, encoding sections 101-1 to 101-$m$ encode data for a maximum of m mobile stations MS#1 to MS#m, respectively, and output the encoded data to modulation sections 102-1 to 102-$m$.

Modulation sections 102-1 to 102-$m$ each modulate the encoded data according to a modulation scheme such as QPSK modulation and 16QAM modulation to generate a data symbol. The generated data symbols are inputted to multiplexing section 104.

On the other hand, a pilot signal sequence is inputted to pilot symbol generation section 103, and pilot symbol generation section 103 modulates this pilot signal sequence as a bit sequence according to BSPK modulation to generate pilot symbols. The generated pilot symbols are inputted to multiplexing section 104. Details of the inputted pilot signal sequence will be described later.

Multiplexing section 104 time-multiplexes the pilot symbols and data symbols, and outputs the multiplexed symbols to IFFT (Inverse Fast Fourier Transform) section 105. By this means, the pilot symbols or data symbols are mapped on each subcarrier which forms an OFDM symbol. In this case, multiplexing section 104 multiplexes the pilot symbol with each subcarrier of the OFDM symbol at the head of a frame. A frame is formed due to this time multiplexing. Furthermore, this pilot symbol is used for channel estimation in a mobile station.

IFFT section 105 performs an IFFT on the plurality of subcarriers on which the pilot symbols or data symbols are mapped, to convert the subcarriers after the IFFT to subcarriers in the time domain and generates an OFDM symbol, which is a multicarrier signal. This OFDM symbol is inputted to GI addition section 106.

GI addition section 106 adds the same signal as that at the tail of the OFDM symbol to the head of the OFDM symbol as a GI (Guard Interval).

Radio transmission section 107 performs transmission processing such as D/A conversion, amplification and up-conversion to the GI-added OFDM symbol and transmits the result from antenna 108 to each mobile station in the sector.

Figure 3:
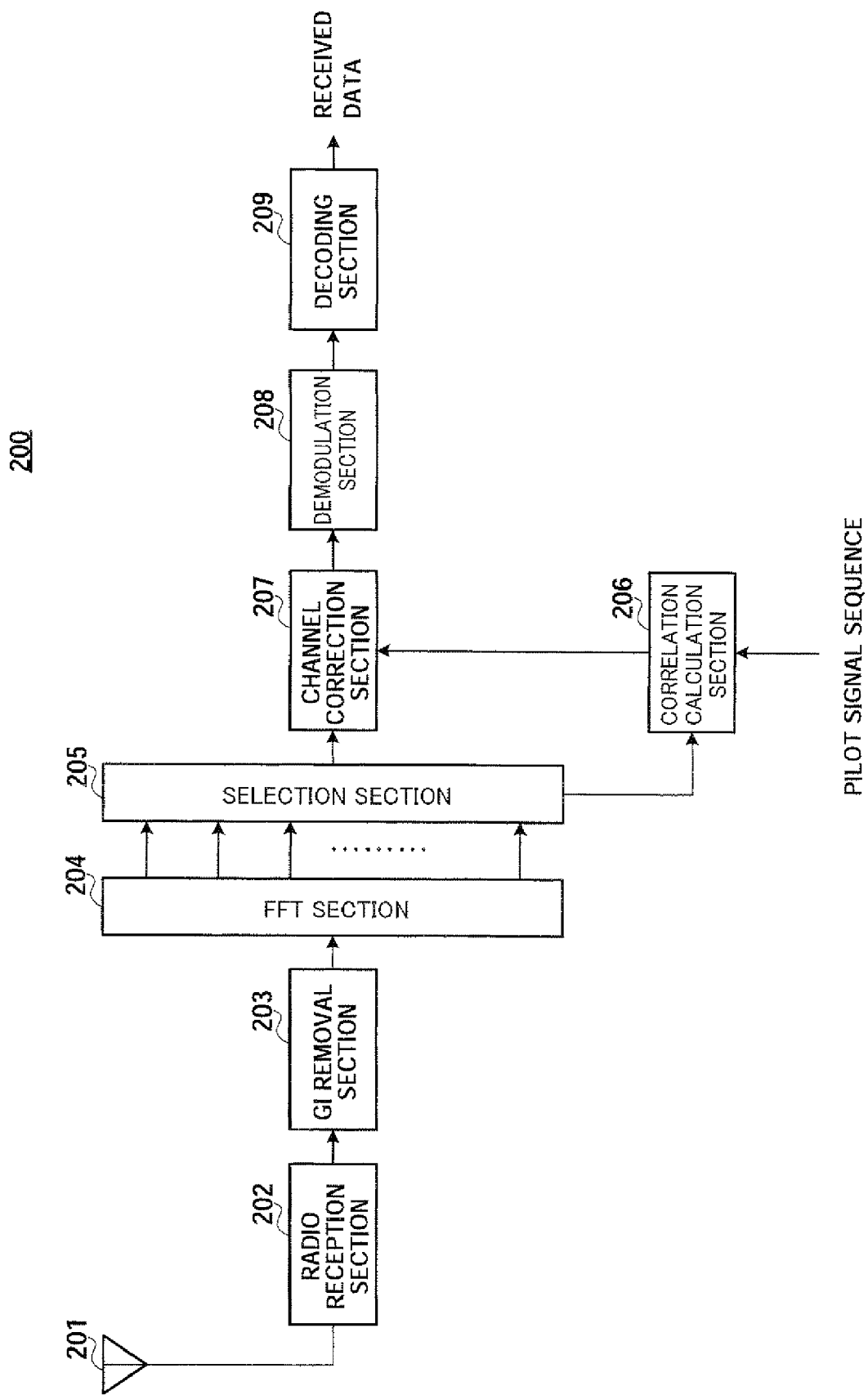
FIG. 3 is a block diagram showing the configuration of a mobile station according to Embodiment 1 of the present invention.

In this way, the OFDM symbol transmitted from radio communication apparatus 100 provided in base station 10 is received by mobile station 200 shown in FIG. 3.

In mobile station 200 shown in FIG. 3, radio reception section 202 performs reception processing such as down-conversion and A/D conversion on the OFDM symbol received through antenna 201 and outputs the result to GI removal section 203.

GI removal section 203 removes the GI added to the OFDM symbol and outputs the result to FFT (Fast Fourier Transform) section 204.

FFT section 204 performs an FFT on the OFDM symbol inputted from GI removal section 203 to convert the OFDM symbol to the symbol in the frequency domain and obtains received pilot symbols and received data symbols. These symbols are inputted to selection section 205.

When the OFDM symbol is a symbol of the head of a frame, selection section 205 selects the received pilot symbol mapped on each subcarrier and outputs the pilot symbol to correlation calculation section 206. Furthermore, when the OFDM symbol is a symbol other than that of the head of the frame, selection section 205 selects the received data symbols mapped on each subcarrier and outputs the data symbols to channel correction section 207.

Correlation calculation section 206 calculates a correlation between the received pilot symbol and the known pilot signal sequence per sector. More specifically, correlation calculation section 206 multiplies the received pilot symbol by a complex conjugate of the known pilot signal sequence and adds up the multiplication results over the correlation calculation range. Channel estimation is carried out through this correlation calculation, and a channel estimation value is obtained as the correlation calculation result. The channel estimation value obtained in this way is inputted to channel correction section 207. Details of the correlation calculation will be described later.

Channel correction section 207 corrects a channel variation of the received data symbols using the channel estimation value. More specifically, channel correction section 207 corrects an amplitude variation and phase variation of the received data symbols by multiplying the received data symbols by a complex conjugate of the channel estimation value. The received data symbols with the channel variation corrected are inputted to demodulation section 208.

Demodulation section 208 demodulates the received data symbols and outputs the demodulated data symbols to decoding section 209.

Decoding section 209 decodes the demodulated received data symbols to obtain received data.

Next, the pilot signal sequence inputted to pilot symbol generation section 103 of radio communication apparatus 100 shown in FIG. 2 will be explained in detail.

Figure 4:
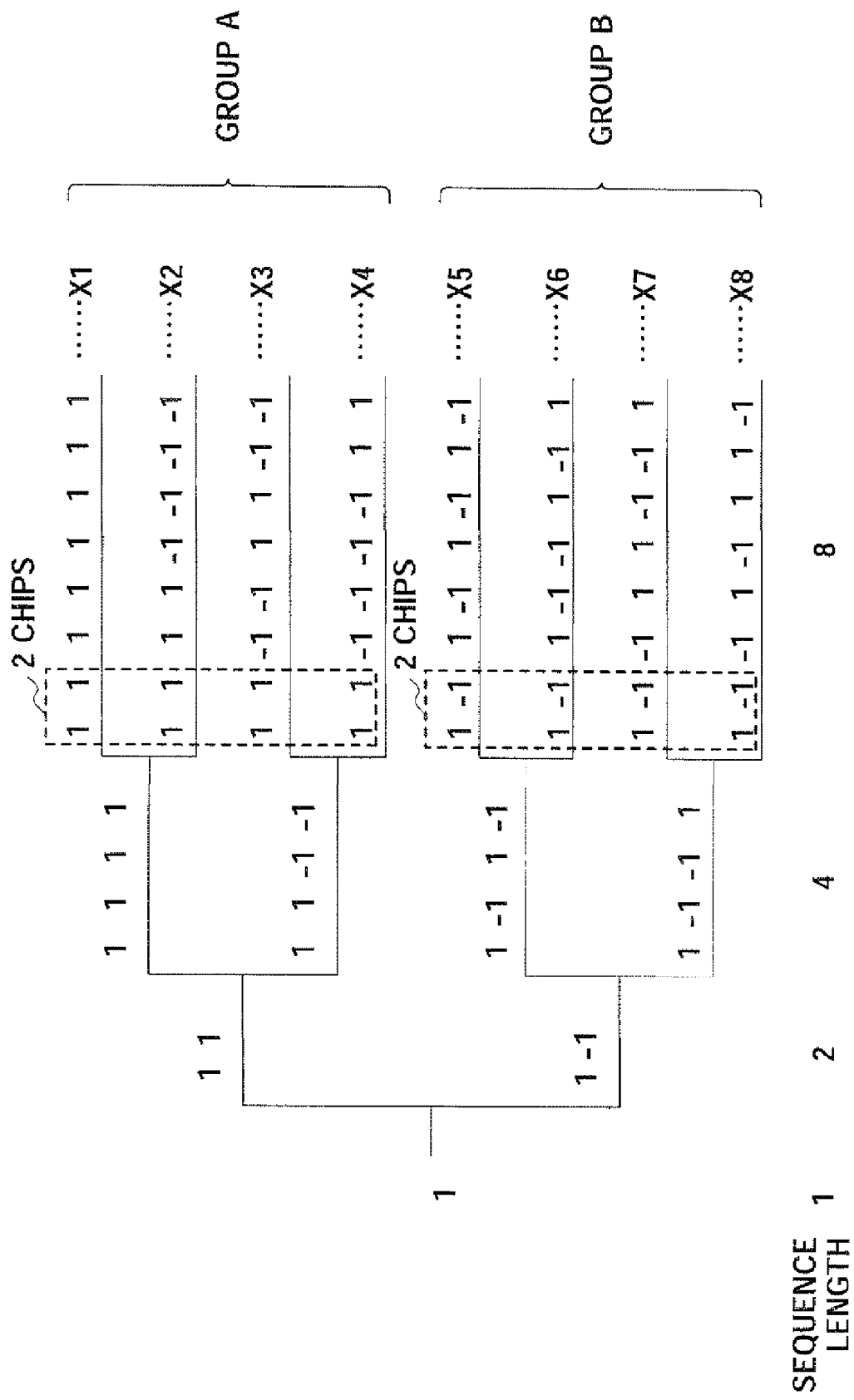
FIG. 4 is a sequence tree of OVSF sequences according to Embodiment 1 of the present invention.

This embodiment uses an OVSF sequence which is an orthogonal sequence as the pilot signal sequence. FIG. 4 shows a sequence tree of OVSF sequences of sequence lengths of 1 to 8. In this way, a plurality of OVSF sequences is expressed using a sequence tree. In the following explanation, 1 and −1 which form each OVSF sequence will be referred to as "chips" for ease of explanation.

The OVSF sequence has a property that sequences that are not in a parent-child relationship in this sequence tree are orthogonal to each other even if these sequences have mutually different sequence lengths. For example, in FIG. 4, sequences X1 to X4 of sequence length 8 derived from sequence 1, 1 of sequence length 2 are orthogonal to each other, but sequences X1 to X4 have a parent-child relationship with sequence 1, 1, and so sequences X1 to X4 are not orthogonal to sequence 1, 1. Furthermore, sequences X5 to X8 of sequence length 8 derived from sequence 1, −1 of sequence length 2 are orthogonal to each other, but sequences X5 to X8 have a parent-child relationship with sequence 1, −1, and so sequence X5 to X8 are not orthogonal to sequence 1, −1.

Furthermore, sequences X1 to X4 are derived from sequence 1, 1 of sequence length 2, and so sequences X1 to X4 are not orthogonal to each other in 2-chip units. Likewise, sequences X5 to X8 are derived from sequence 1, −1 of sequence length 2, and so sequences X5 to X8 are not orthogonal to each other in 2-chip units. Eight chips are required to make all these sequences X1 to X4 and X5 to X8 orthogonal to each other.

On the other hand, when sequences X1 to X4 are compared with sequences X5 to X8, sequences X1 to X4 and sequences X5 to X8 are derived from mutually different sequences of sequence length 2 (i.e., sequence 1, 1 and sequence 1, −1). Therefore, sequences X1 to X4 and sequences X5 to X8 are orthogonal to each other in 2-chip units.

That is, for example, sequence X1 is orthogonal to none of sequences X2 to X4 in 2-chip units, but sequence X1 is orthogonal to all sequences X5 to X8. Furthermore, sequence X5 is orthogonal to none of sequences X6 to X8 in 2-chip units, but sequence X5 is orthogonal to all sequences X1 to X4.

Therefore, the present embodiment assumes that sequences X1 to X4 form group A and sequences X5 to X8 form group B as shown in FIG. 4. That is, eight OVSF sequences of sequence length 8 which are orthogonal to each other, are divided into two groups according to two OVSF sequences of sequence length 2, which are higher sequences than these eight OVSF sequences in the sequence tree. Therefore, sequences which belong to group A and sequences which belong to group B are orthogonal to each other in 2-chip units.

Figure 5:
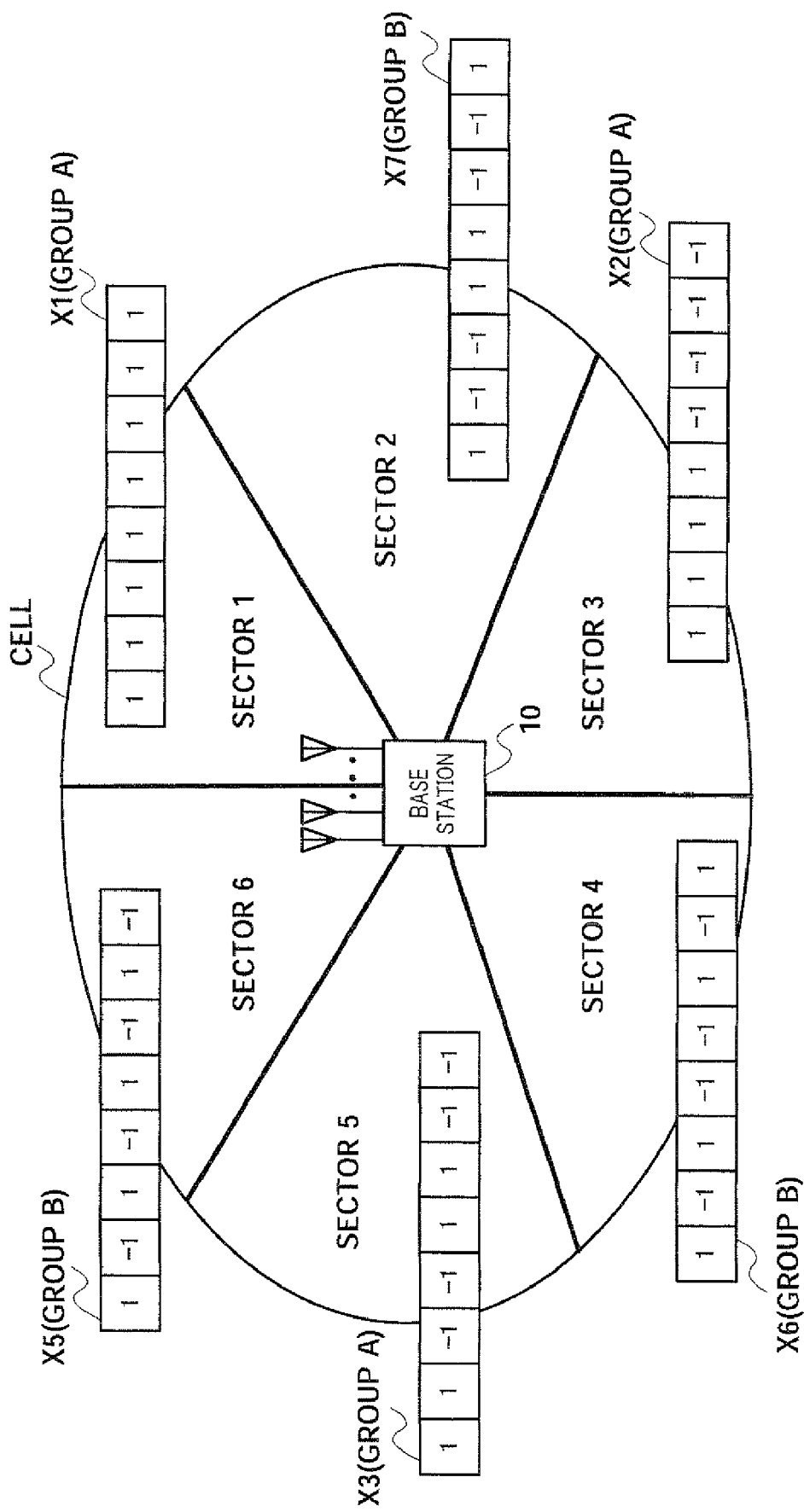
FIG. 5 is an example of assignment of pilot signal sequences according to Embodiment 1 of the present invention.

Any one sequence of these OVSF sequences of sequence length 8 is assigned to each sector in each group selected for each sector as shown in FIG. 5. FIG. 5 shows an example where one cell is divided into six sectors. Here, there are six sectors, and so eight OVSF sequences of sequence length 8 are used to assign mutually different pilot sequences to the respective sectors.

That is, as shown in FIG. 5, the present embodiment assigns OVSF sequences which belong to mutually different groups to mutually neighboring sectors as pilot signal sequences. That is, as shown in FIG. 5, sequences of group A and sequences of group B are assigned to sectors 1 to 6 alternately. For example, when sequence X1 of group A is assigned to sector 1, sequence X5 of group B is assigned to sector 6 which is one of the neighboring sectors of sector 1, and sequence X7 of group B is assigned to sector 2 which is the other neighboring sector.

When attention is focused on sector 1 and sector 2, out of the eight OVSF sequences which are orthogonal to each other and which have sequence length 8, sequence X1 and sequence X7 which are orthogonal to each other in 2-chip units shorter than sequence length 8 are assigned to the mutually neighboring sectors, respectively.

Furthermore, when attention is focused on sector 1, out of the eight OVSF sequences which are orthogonal to each other and which have the same sequence length 8, sequence X1, which is orthogonal to sequence X7 in 2-chip units shorter than sequence length 8, is assigned to sector 1. Sequence X7 is used as a pilot signal sequence in sector 2 which is the neighboring sector of sector 1. This assignment can be realized by assigning to sector 1 an OVSF sequence of group A derived from higher sequence 1, 1, which is different from higher sequence 1, −1 of the OVSF sequence of group B assigned to sector 2 in the sequence tree shown in FIG. 4.

The OVSF sequences assigned to the respective sectors in this way are inputted to pilot symbol generation section 103 in radio communication apparatus 100 for each sector as pilot signal sequences, and the inputted OVSF sequences are multiplexed with the respective subcarriers of the OFDM symbol at the head of a frame and are transmitted to mobile station 200.

Next, the correlation calculation carried out in correlation calculation section 206 of mobile station 200 shown in FIG. 3 will be explained in detail.

Correlation calculation section 206 calculates a correlation between a received pilot symbol and the known pilot signal sequence per sector. For example, correlation calculation section 206 of mobile station 200 located in sector 5 in FIG. 5 calculates a correlation between the received pilot symbol and sequence X3. In this case, correlation calculation section 206 calculates a correlation between the received pilot symbol and sequence X3 in units shorter than sequence length 8 of sequence X3 as shown in the following correlation calculation examples 1 to 3. In the following explanation, mobile station 200 located in sector 5 will be explained as an example.

<Correlation Calculation Example 1 (FIG. 6)>

Sequence X3 assigned to sector 5, sequence X5 assigned to sector 6 which is one of the neighboring sectors, and sequence X6 assigned to sector 4 which is the other neighboring sector, are orthogonal to each other in 2-chip units between the neighboring sectors as described above.

Figure 6:
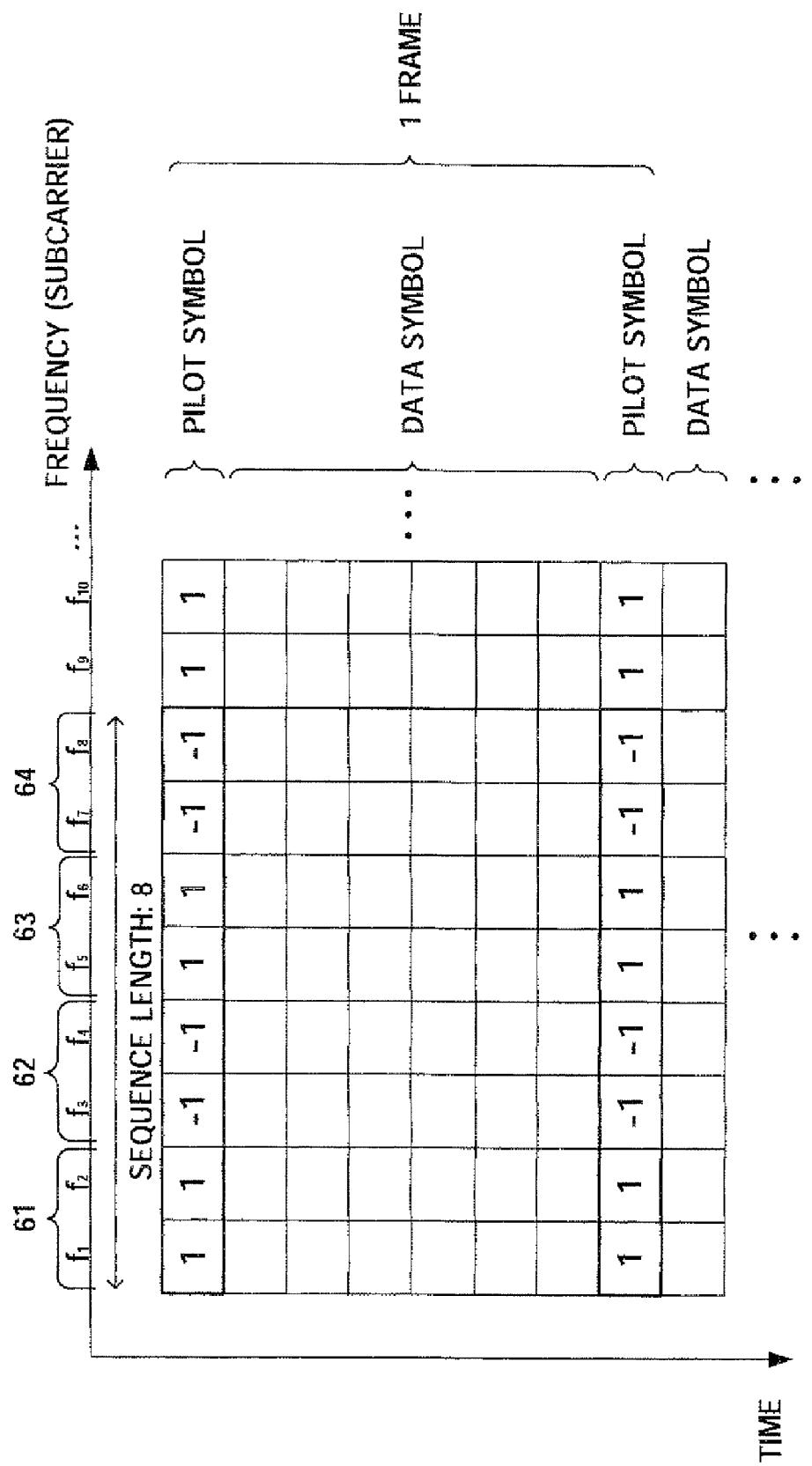
FIG. 6 is an example of correlation calculation according to Embodiment 1 of the present invention (Example 1)

Thus, in correlation calculation example 1, correlation calculation section 206 multiplies the received pilot symbol by complex conjugates of sequence X3 divided in 2-chip units and adds up the multiplication results in 2-chip units. More specifically, as shown in FIG. 6, correlation calculation section 206 divides sequence X3 of 1, 1, −1, −1, 1, 1, −1, −1 of sequence length 8 into 61(1, 1), 62(−1, −1), 63(1, 1), and 64(−1, −1) in 2-chip units, and carries out a total of four correlation calculations in 2-chip units. Therefore, four channel estimation values are obtained with respect to sequence X3 of sequence length 8 by these four correlation calculations.

Figure 7:
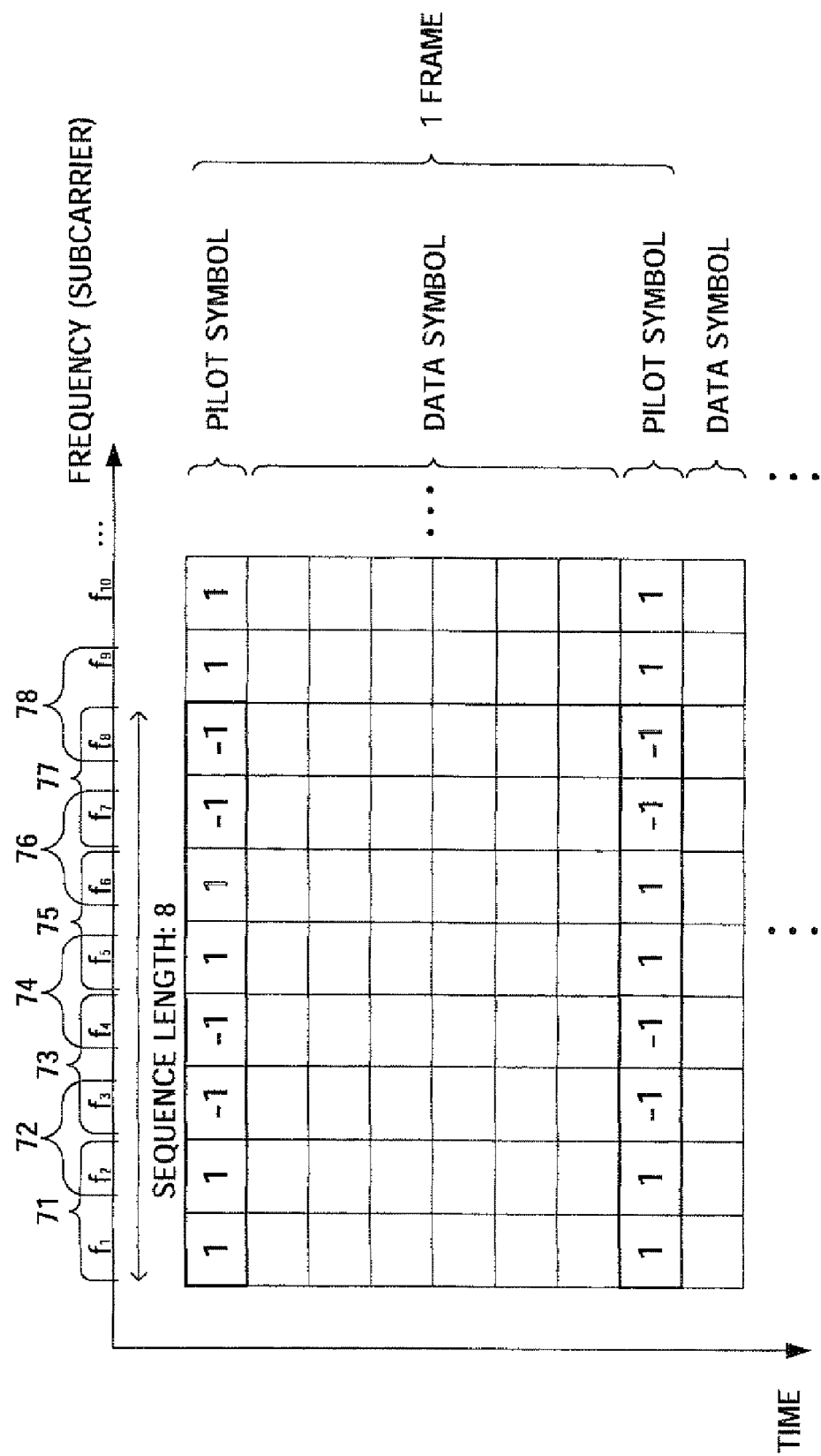
FIG. 7 is an example of correlation calculation according to Embodiment 1 of the present invention (Example 2)

<Correlation Calculation Example 2 (FIG. 7)>

In correlation calculation example 2, correlation calculation section 206 shifts the start position of each correlation calculation by an amount shorter than a 2-chip unit and calculates correlations. More specifically, as shown by 71 to 78 in FIG. 7, correlation calculation section 206 shifts the range of each correlation calculation in 2-chip units by 1 chip (i.e., by 1 subcarrier) rightward (i.e., in the direction in which the frequency increases) and carries out a total of eight correlation calculations. Thus, eight channel estimation values are obtained with respect to sequence X3 of sequence length 8 by these eight correlation calculations.

<Correlation Calculation Example 3 (FIG. 8)>

Sequence X3 assigned to sector 5, sequence X5 assigned to sector 6 which is one of the neighboring sectors, and sequence X6 assigned to sector 4 which is the other neighboring sector, are also orthogonal to each other in 4-chip units between the neighboring sectors.

Figure 8:
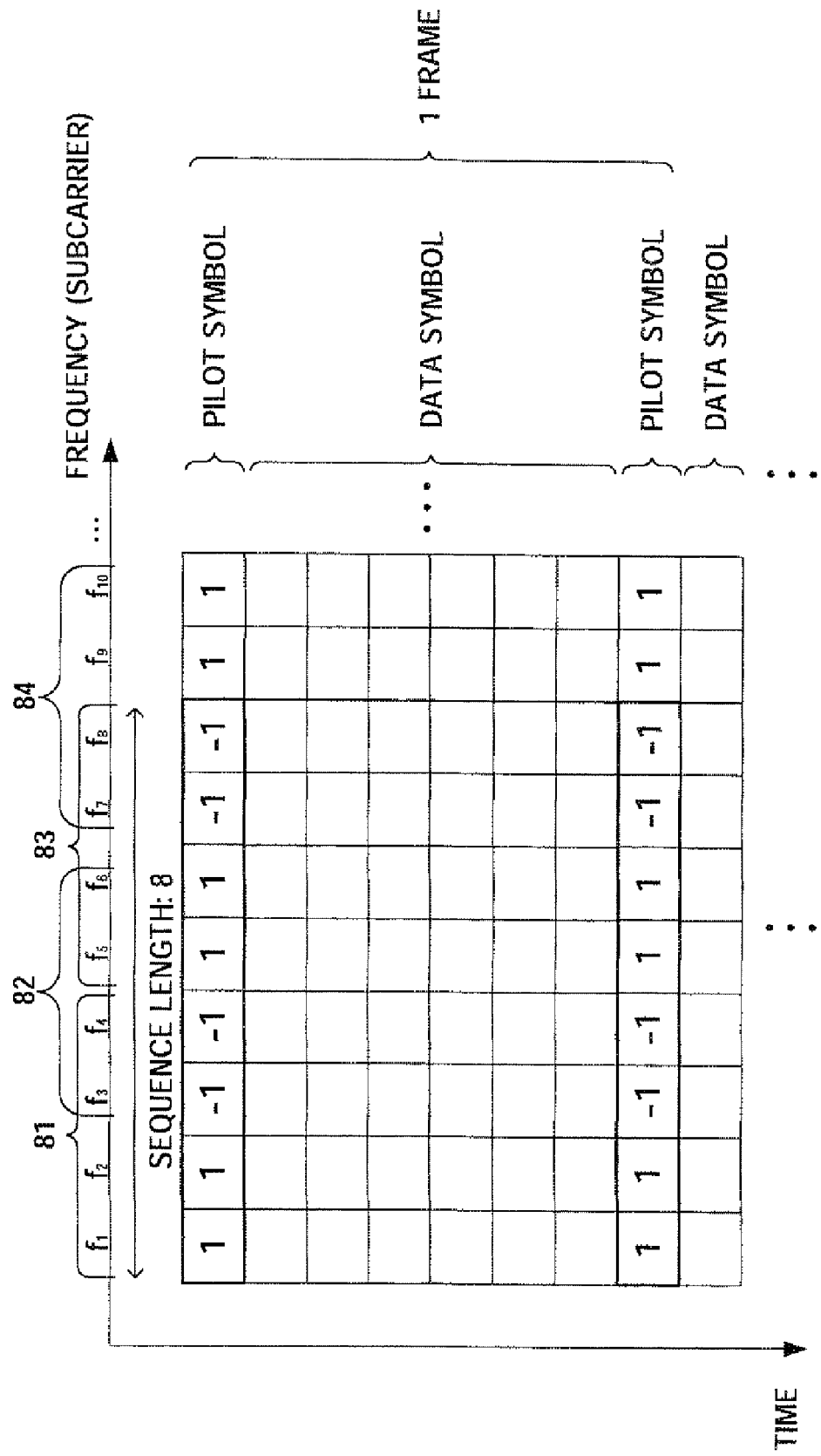
FIG. 8 is an example of correlation calculation according to Embodiment 1 of the present invention (Example 3)

Therefore, in correlation calculation example 3, when the frequency selective variation in a channel becomes smaller than the states of correlation calculation examples 1 and 2 (i.e., when the variation in the frequency domain becomes smaller), the unit correlation calculation is increased to 4 chips as shown by 81 to 84 in FIG. 8. This increases the number of pilot symbols used to obtain one channel estimation value, and the accuracy of channel estimation improves.

Furthermore, in this example, in order to respond to the fading variation in the frequency domain, the range of each correlation calculation in 4-chip units is sequentially shifted by 2 chips (i.e., 2 subcarriers) rightward (i.e., the direction in which the frequency increases) as shown by 81 to in FIG. 8. That is, as in the case of correlation calculation example 2, correlation calculation section 206 shifts the start position of each correlation calculation by an amount shorter than the 4-chip unit and calculates correlations. The start position can be shifted by 1 chip, but the number of correlation calculations for channel estimation increases. Further, the start position can be shifted by 3 chips, but the response to the fading variation in the frequency domain becomes worse. Therefore, the start position is shifted by 2 chips in this example.

In this way, in correlation calculation example 3, the unit of correlation calculation is changed depending on the magnitude of frequency selective variation in the channel. That is, when the frequency selective variation becomes larger (i.e., when the delay dispersion in the channel becomes larger), the unit of correlation calculation becomes smaller, and, by contrast, when the frequency selective variation becomes smaller (i.e., when the delay dispersion in the channel becomes smaller), the unit of correlation calculation becomes larger within a range not exceeding sequence length 8. By changing the unit of correlation calculation in this way, it is possible to realize channel estimation with high accuracy according to the channel condition. That is, when the frequency selective variation is large, it is possible to minimize the loss of orthogonality between pilot signal sequences in neighboring sectors by decreasing the unit of correlation calculation, and, when the frequency selective variation is small, it is possible to increase total pilot signal power upon calculating a channel estimation value by increasing the unit of correlation calculation and improve the accuracy of channel estimation by an averaging effect on noise.

As described above, according to the present embodiment, out of the plurality of OVSF sequences which are orthogonal to each other and which have the same sequence length, OVSF sequences orthogonal to each other in units shorter than the sequence length are assigned to the respective neighboring sectors as pilot signal sequences. For this reason, even when the number of sectors included in one cell is large and the sequence length of an OVSF sequence, which is a pilot signal sequence, is long, it is possible to make the unit of correlation calculation upon channel estimation in the mobile station shorter than the sequence length. This allows the mobile station to set one unit of correlation calculation upon channel estimation, shorter than the sequence length of the pilot signal sequence. Therefore, even a mobile station having large frequency selectivity of fading can prevent the loss of orthogonality between the received pilot signal sequence and the pilot signal sequence in the neighboring sector and prevent deterioration of the reception performances.

Furthermore, as shown in correlation calculation example 2 (FIG. 7), by shifting the start position of each correlation calculation by an amount shorter than the correlation calculation unit and calculating a correlation, the mobile station can obtain more channel estimation values. Therefore, according to correlation calculation example 2, it is possible to prevent the loss of orthogonality between pilot signal sequences in the neighboring sectors even in a more significant frequency selective fading environment.

Embodiment 2

Figure 9:
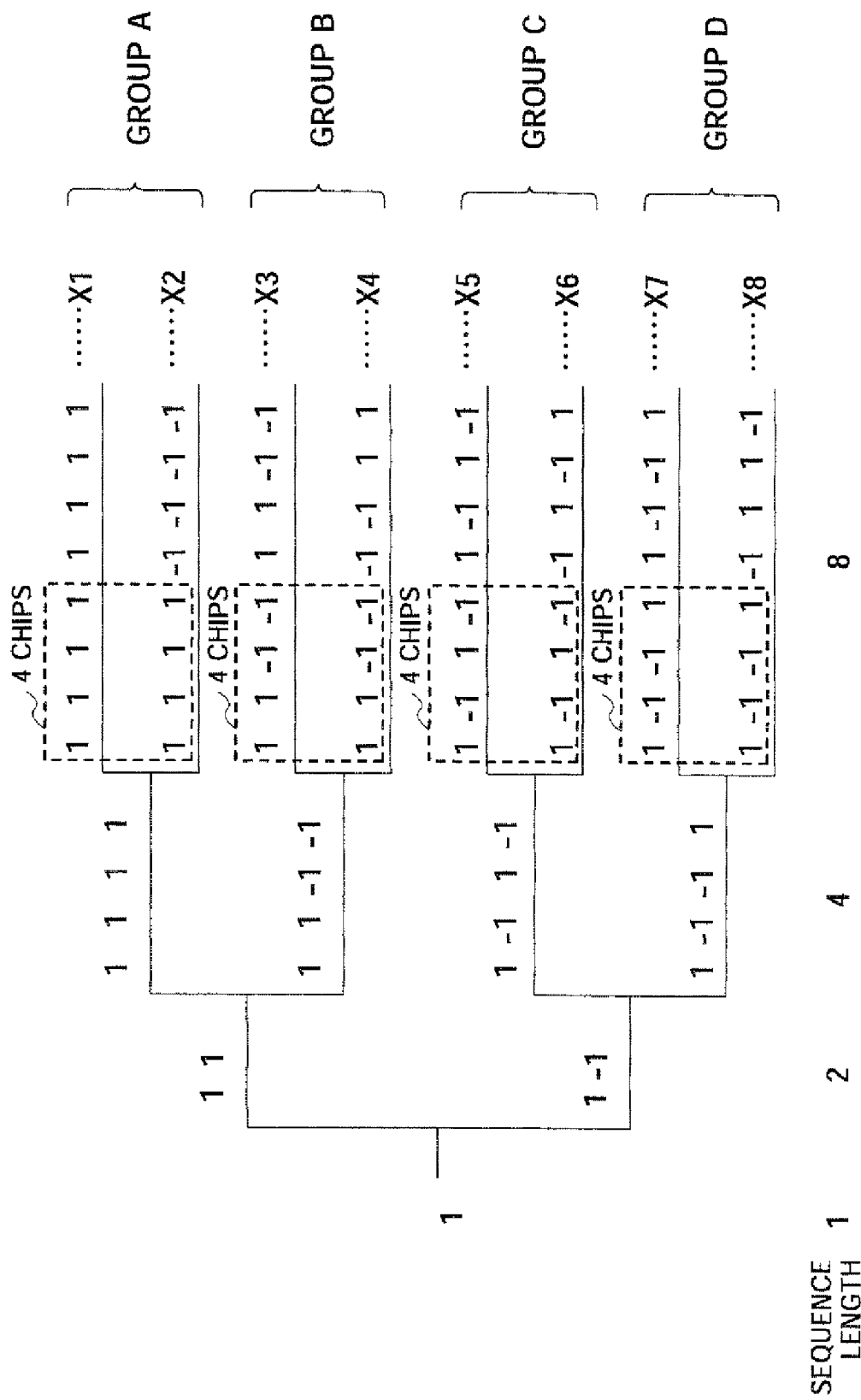
FIG. 9 is a sequence tree of OVSF sequences according to Embodiment 2 of the present invention.

As shown in FIG. 9, the present embodiment differs from Embodiment 1 in that eight OVSF sequences which are orthogonal to each other and which have sequence length 8 are divided into four groups A to D according to four OVSF sequences of sequence length 4, which are higher sequences than these eight OVSF sequences in the sequence tree.

In the present embodiment, as shown in FIG. 9 is assumed that sequences X1 and X2 form group A, sequences X3 and X4 form group B, sequences X5 and X6 form group C and sequences X7 and X8 form group D. Thus, the respective sequences are orthogonal to each other in 4-chip units among groups A to D.

Figure 10:
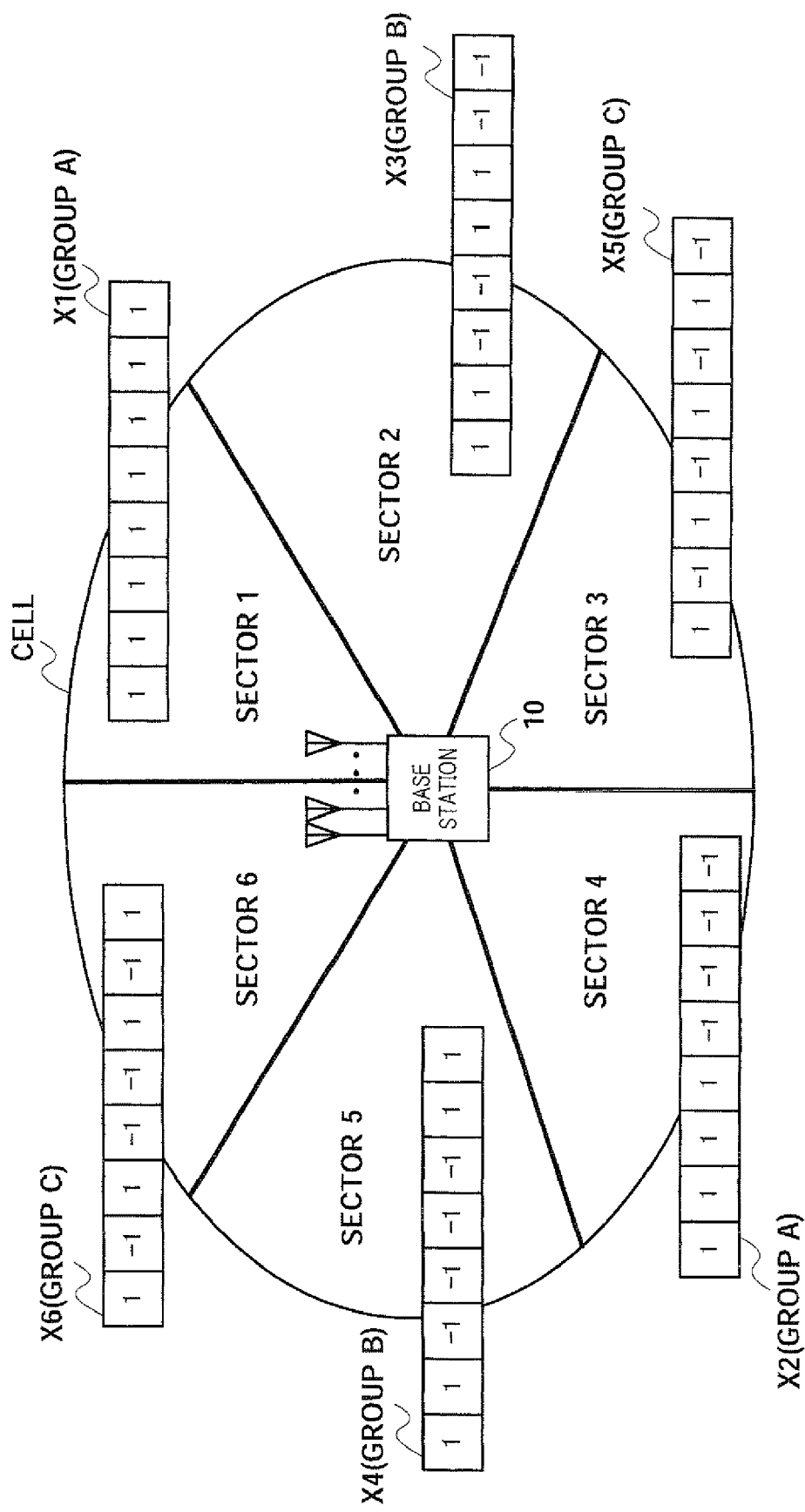
FIG. 10 is an example of assignment of pilot signal sequences according to Embodiment 2 of the present invention (No. 1)

According to such grouping, the present embodiment assigns any one of these OVSF sequences of sequence length 8 to each sector in each group selected per sector as shown in FIG. 10. FIG. 10 shows an example where one cell is divided into six sectors as in the case of Embodiment 1.

That is, as shown in FIG. 10, the present embodiment assigns OVSF sequences which belong to mutually different groups to mutually neighboring sectors as pilot signal sequences as in the case of Embodiment 1. Furthermore, the present embodiment also assigns OVSF sequences which belong to mutually different groups to sectors separated from each other by two sectors as pilot signal sequences. That is, as shown in FIG. 10, sequences of group A, sequences of group B and sequences of group C are sequentially assigned to sectors 1 to 6. For example, when sequence X1 of group A is assigned to sector 1, sequence X6 of group C is assigned to sector 6 which is one of the neighboring sectors of sector 1, and sequence X3 of group B is assigned to sector 2 which is the other neighboring sector. Furthermore, sequence X4 of group B and sequence X5 of group C are assigned to sector 5 and sector 3, respectively, which are separated from sector 1 by two sectors.

Here, when attention is focused on sector and sector 2, out of the eight OVSF sequences which are orthogonal to each other and which have sequence length 8, sequence X1 and sequence X3 which are orthogonal to each other in 4-chip units are assigned to mutually neighboring sectors. Further, when attention is focused on sector 1 and sector 3, out of the eight OVSF sequences which are orthogonal to each other and which have sequence length 8, sequence X1 and sequence X5 orthogonal to each other in 4-chip units are assigned to sectors separated from each other by two sectors.

Each OVSF sequence assigned to each sector in this way is inputted to pilot symbol generation section 103 of radio communication apparatus 100 for each sector as a pilot signal sequence, is multiplexed with each subcarrier of the OFDM symbol at the head of a frame and is transmitted to mobile station 200.

By assigning OVSF sequences to the respective sectors in this way, it is possible to keep orthogonality of pilot signal sequences not only between neighboring sectors but also between sectors separated from each other by two sectors and reduce interference of pilot signal sequences between sectors.

In the present embodiment, according to the above-described assignment of pilot signal sequences, mobile station 200 calculates correlations in 4-chip units upon channel estimation.

Figure 11:
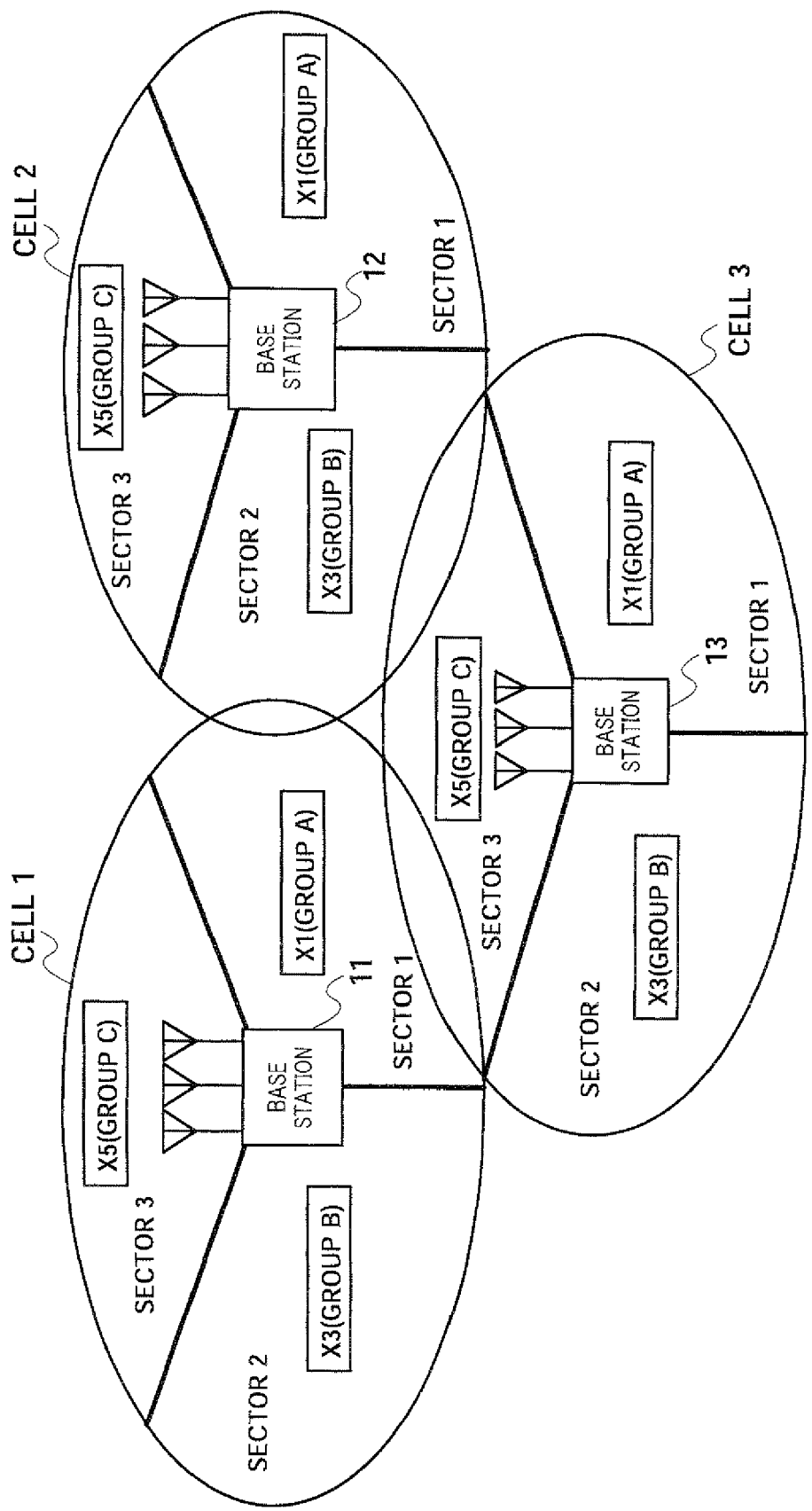
FIG. 11 is an example of assignment of pilot signal sequences according to Embodiment 2 of the present invention (No. 2)

Furthermore, in the present embodiment, as shown in FIG. 11, when the number of neighboring sectors further increases by dividing each of a plurality of mutually neighboring cells into a plurality of sectors, OVSF sequences orthogonal to each other in 4-chip units are assigned to the respective sectors so that pilot signal sequences are made orthogonal to each other in units shorter than sequence length 8 between neighboring sectors. For example, in the example shown in FIG. 11, sequence X1 of group A is assigned to sector 1 of cell 1, sequence X3 of group B is assigned to sector 2 of cell 2 and sequence X5 of group C is assigned to sector 3 of cell 3. In this way, when the number of neighboring sectors becomes larger, the present embodiment assigns mutually different OVSF sequences which are lower sequences in the sequence tree and derived from mutually different higher sequences, to mutually neighboring sectors. With such assignment, even when the number of neighboring sectors increases, it is possible to make pilot signal sequences orthogonal to each other in units shorter than the sequence length between neighboring sectors.

Furthermore, by changing the number of groups according to the number of neighboring sectors, that is, by assigning mutually different OVSF sequences which are lower sequences in the sequence tree and derived from mutually different higher sequences, to mutually neighboring sectors when the number of neighboring sectors becomes larger, and assigning mutually different OVSF sequences which are higher sequences in the sequence tree and derived from mutually different higher sequences, to mutually neighboring sectors when the number of neighboring sectors becomes smaller, it is possible to minimize the range in which pilot signal sequences are orthogonal to each other according to the number of neighboring sectors and maximize the number of high accuracy channel estimation values obtained through correlation calculations at a mobile station according to the number of neighboring sectors.

In FIG. 11, base stations 11 to 13 each have the same configuration as that of base station 10.

The embodiments of the present invention have been explained above.

Although a case has been described with the above-described explanations where the present invention is implemented between neighboring sectors, it is also possible to implement the present invention between neighboring cells in the same way as described above by regarding sectors as cells. In this case, the base station in each cell employs the configuration shown in FIG. 2.

Furthermore, a mobile station may be referred to as a "UE," base station apparatus as "Node B" and subcarrier as a "tone."

Furthermore, pilot signal sequences need not to be mapped on all subcarriers forming an OFDM symbol.

Furthermore, pilot signal sequences may also be multiplexed using a multiplexing method other than time multiplexing (e.g., frequency multiplexing).

Figure 12:
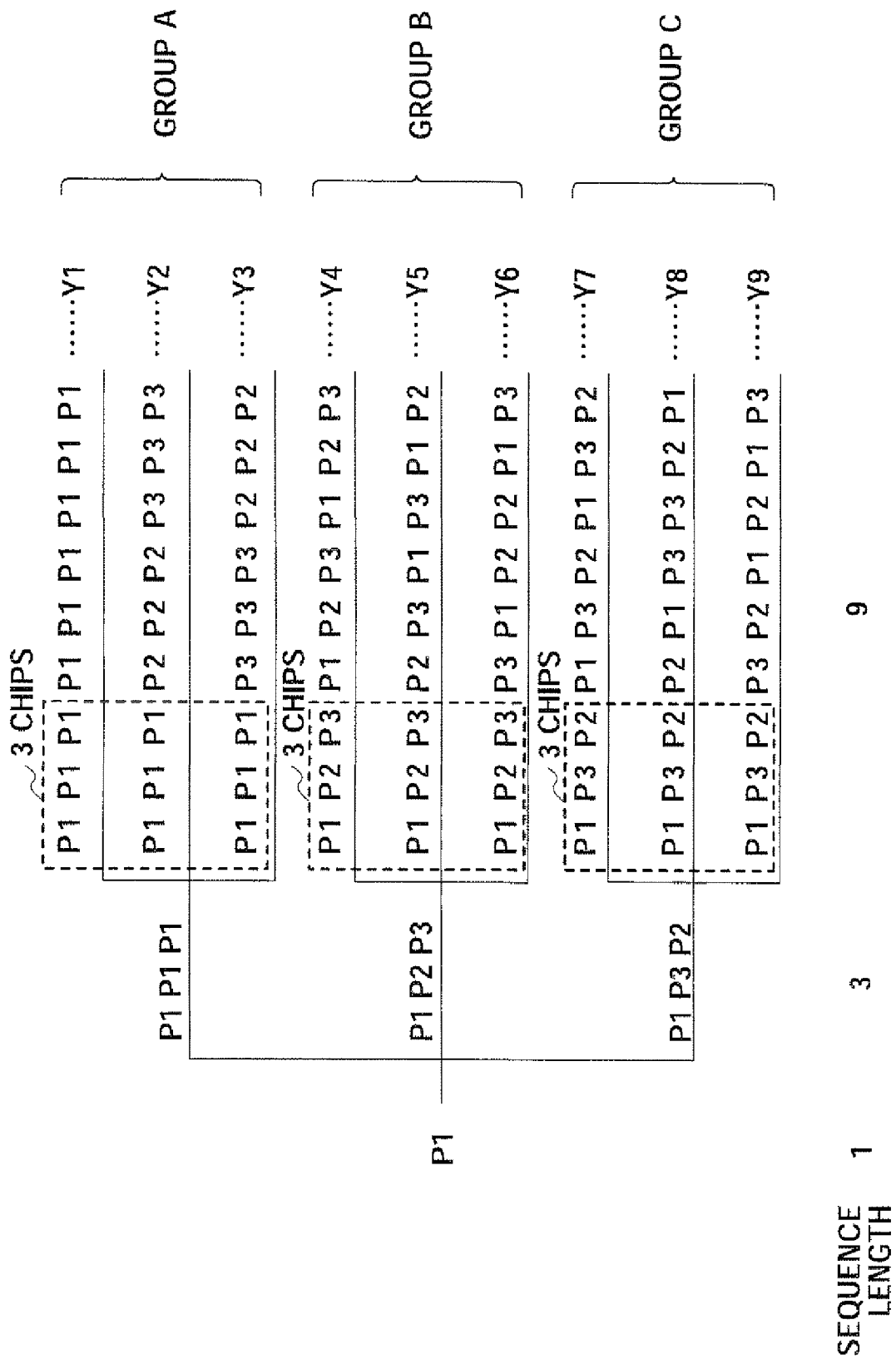
FIG. 12 is a sequence tree of phase rotation sequences.

Furthermore, a case has been described with the above-described embodiments where OVSF sequences are used as pilot signal sequences, but other orthogonal sequences such as phase rotation sequences may also be used as pilot signal sequences. FIG. 12 shows a sequence tree of phase rotation sequences. Here, P1=1, P2=exp(j2π/3), P3=exp(−j2π/3). In this example, nine phase rotation sequences of sequence length 9 are divided into groups A to C. That is, it is assumed that sequences Y1 to Y3 derived from sequences P1, P1, P1 form group A, sequences Y4 to Y6 derived from sequences P1, P2, P3 form group B, and sequences Y7 to Y9 derived from sequences P1, P3, P2 form group C. Therefore, between groups A to C, the respective sequences are orthogonal to each other in 3-chip units shorter than sequence length 9.

Further, a case has been described with the above described embodiments where orthogonal sequences are subject to BPSK modulation to generate pilot symbols, pilot symbols may also be generated by multiplying predetermined known symbols by orthogonal sequences. Furthermore, the generated pilot symbols may also be multiplied by a scrambling code which is unique to a cell (base station).

Furthermore, in the present embodiment, although the present invention is configured with hardware as an example, the present invention can also be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-220616, filed on Jul. 29, 2005, entire content of which is expressly incorporated by reference herein.

INDUSTRIAL APPLICABILITY

The present invention is suitable for use in, for example, a mobile communication system.

The invention claimed is:

1. A radio communication base station apparatus that transmits a multicarrier signal comprised of a plurality of subcarriers, comprising:
   a multiplexing section that multiplexes one of a plurality of orthogonal sequences which are orthogonal to each other and which have a same sequence length, as a pilot signal sequence with the plurality of subcarriers; and
   a transmission section that transmits the multicarrier signal multiplexed with the pilot signal sequence,
   wherein the multiplexing section multiplexes, out of the plurality of orthogonal sequences, a second orthogonal sequence with the plurality of subcarriers, the second orthogonal sequence being orthogonal to a first orthogonal sequence used as a pilot signal sequence in a neighboring sector or a neighboring cell in units shorter than the sequence length.

2. The radio communication base station apparatus according to claim 1, wherein:
   the plurality of orthogonal sequences are expressed using a sequence tree; and
   the multiplexing section multiplexes the second orthogonal sequence derived from a higher sequence which is different from a higher sequence of the first orthogonal sequence in the sequence tree.

3. The radio communication base station apparatus according to claim 2, wherein, when the number of the neighboring sectors or the number of the neighboring cells becomes larger, the multiplexing section multiplexes the second orthogonal sequence which is a lower sequence in the sequence tree and which is derived from the higher sequence different from the higher sequence of the first orthogonal sequence.

4. A radio communication mobile station apparatus that receives a multicarrier signal comprised of a plurality of subcarriers, wherein one of a plurality of orthogonal sequences, which are orthogonal to each other and which have a same sequence length, is multiplexed as a pilot signal sequence with the plurality of subcarriers, the apparatus comprising:
   a reception section that receives the multicarrier signal multiplexed with a second orthogonal sequence which is orthogonal to a first orthogonal sequence used as a pilot signal sequence in a neighboring sector or a neighboring cell, out of the plurality of orthogonal sequences in units shorter than the sequence length;
   a conversion section that converts the received multicarrier signal to a signal in a frequency domain to obtain a received pilot signal sequence; and
   a correlation calculation section that calculates a correlation between the received pilot signal sequence and the second orthogonal sequence in units shorter than the sequence length.

5. The radio communication mobile station apparatus according to claim 4, wherein the correlation calculation section shifts a start position of the correlation calculation by an amount shorter than the unit and calculates the correlation.

6. The radio communication mobile station apparatus according to claim 4, wherein the correlation calculation section makes the unit larger when a frequency selective variation in a channel becomes smaller.

7. A pilot signal sequence assignment method for mutually neighboring sectors or mutually neighboring cells, comprising:
   assigning, out of a plurality of sequences which are orthogonal to each other and which have a same sequence length, a first orthogonal sequence and a second orthogonal sequence, which are orthogonal to each other in units shorter than the sequence length, to the mutually neighboring sectors or the mutually neighboring cells, respectively.

* * * * *